United States Patent
Kanai et al.

(10) Patent No.: US 6,607,587 B1
(45) Date of Patent: Aug. 19, 2003

(54) ANTICORROSIVE COATING MATERIAL AND METHOD OF RUST PREVENTION

(75) Inventors: Hiroshi Kanai, Chiba (JP); Toshiaki Shimakura, Osaka (JP)

(73) Assignees: Nippon Steel Corporation, Tokyo (JP); Nippon Paint Co., Ltd., Osaka (JP)

( * ) Notice: Subject to any disclaimer, the term of this patent is extended or adjusted under 35 U.S.C. 154(b) by 0 days.

(21) Appl. No.: 09/622,550

(22) PCT Filed: Feb. 16, 1999

(86) PCT No.: PCT/JP99/00663

§ 371 (c)(1),
(2), (4) Date: Nov. 6, 2000

(87) PCT Pub. No.: WO99/42638

PCT Pub. Date: Aug. 26, 1999

(30) Foreign Application Priority Data

Feb. 18, 1998 (JP) ............................................. 10-036265

(51) Int. Cl.⁷ .............................. C08J 3/00; C08K 5/52; C08L 75/00; C09D 5/08
(52) U.S. Cl. ................. 106/14.44; 148/243; 427/372.2; 427/385.5; 428/425.8; 428/545; 524/140; 524/211; 524/539; 524/591; 524/839; 524/840
(58) Field of Search ...................... 106/14.44; 148/243; 427/372.2, 385.5; 428/425.8, 545; 524/140, 211, 539, 591, 839, 840

(56) References Cited

U.S. PATENT DOCUMENTS

| | | | |
|---|---|---|---|
| 4,097,287 A | 6/1978 | Ito et al. ................. | 106/14.14 |
| 4,330,446 A | 5/1982 | Miyosawa ................. | 523/409 |
| 4,910,097 A | 3/1990 | Nomura et al. ............. | 428/623 |
| 5,969,019 A | * 10/1999 | Kanai et al. ............. | 427/372.2 |

FOREIGN PATENT DOCUMENTS

| | | | |
|---|---|---|---|
| GB | 1 572 210 | | 7/1980 |
| JP | 52-38544 | * | 3/1977 |
| JP | 52-38545 | * | 3/1977 |
| JP | 53-31737 | | 3/1978 |
| JP | 53-37150 | | 4/1978 |
| JP | 54-71734 | | 6/1979 |
| JP | 61-223062 | | 10/1986 |
| JP | 3-131370 | | 6/1991 |
| JP | 3-226584 | | 10/1991 |
| JP | 6-79232 | | 3/1994 |
| JP | 8-67834 | | 3/1996 |
| JP | 8-239776 | | 9/1996 |
| JP | 2809592 | | 7/1998 |
| JP | 10-195345 | | 7/1998 |
| JP | 11-29724 | | 2/1999 |

OTHER PUBLICATIONS

Derwent Patent Abstract No. 1976–60646X, abstract of Japanese Patent Specification No. 51–073029 (Jun. 1976).*
Derwent Patent Abstract No. 1976–60789X, abstract of Japanese Patent Specification No. 51–073534 (Jun. 1976).*

* cited by examiner

*Primary Examiner*—Anthony J. Green
(74) *Attorney, Agent, or Firm*—Wenderoth, Lind & Ponack, L.L.P.

(57) ABSTRACT

The present invention provides a non-chromium anticorrosive coatings suitable for metal materials comprising 0.2 to 50 g of a thiocarbonyl group-containing compound and 50 to 500 g of a water-dispersible silica without a substantial amount of a phosphate ion in one liter of a composition containing aqueous resins and water as main components, and an anticorrosive treatment using the anticorrosive coatings described above.

6 Claims, No Drawings

ANTICORROSIVE COATING MATERIAL AND METHOD OF RUST PREVENTION

TECHNICAL FIELD

The present invention relates to a surface treatment composition and a surface treatment for a metal material, a steel plated with a metal (referred to as a metal-plated steel hereinafter) or a non-plated steel, and provides an anticorrosive agent capable of imparting a sufficient corrosion resistance to a metal material.

BACKGROUND ART

A metal-plated steel undergoes the formation of white rusts on their surface in a salt-containing atmosphere such as a sea water or in a high-temperature/high humidity atmosphere, resulting in a markedly deteriorated appearance or a reduced anticorrosive ability of a substrate iron surface.

In order to prevent the formation of such white rusts, a chromate-based anticorrosive treatment agent has been employed, such as a resin-based treatment agent disclosed in Japanese Patent Application Laid-Open No. 3-131370, which contains a water-dispersible chrome compound and a water-dispersible silica in an olefin-α, β-ethylenically unsaturated carboxylic acid copolymer resin dispersion.

However, a chromium-containing resin-based treatment agent described above dose not always exhibit a sufficient corrosion resistance, and undergoes the formation of the white rusts when exposed to a salty water or a high temperature/high humidity atmosphere for a prolonged period. Recently, a non-chromium anticorrosive treatment agent is desired increasingly.

We had discovered that a sulfide ion reacts with zinc to form a stable ZnS coating and had disclosed non-chromium anticorrosive treatment agents employing a sulfide and sulfur in Japanese Patent Application Laid-Open No. 8-239776 and No. 8-67834.

Nevertheless, some of the sulfides exhibit peculiar odors and are not always handled easily.

An anticorrosive treatment agent employing a triazinethiol compound which contains a sulfur atom but has no odor or toxicity was also proposed. For example, Japanese Patent Application Laid-Open No. 53-31737 titled "water-soluble anticorrosive paints" discloses a water-soluble anticorrosive paint containing a dithiol-S-triazine derivative.

Japanese Patent Application Laid-Open No. 61-223062 titled "Emulsions having reactivity with metals" discloses an emulsion having a reactivity with a metal obtained by mixing a thiocarbonyl group-containing compound and an organic compound which is hardly soluble or insoluble in water.

However, a water-soluble anticorrosive paint disclosed in Japanese Patent Application Laid-Open No. 53-31737 described above is intended to prevent the corrosion of a soft steel, copper, brass, a copper wire and the like, and is formulated so that it enables a tight contact especially when a substrate is a copper and a brass. Accordingly, it is not satisfactory when used as an anticorrosive agent for the surface of a metal such as zinc.

A reactive emulsion disclosed in Japanese Patent Application Laid-Open No. 61-223062 described above is not satisfactory either when used as an anticorrosive agent for the surface of a metal such as zinc, since it is also an emulsion which reacts with copper, nickel, tin, cobalt, aluminum and alloys thereof.

We made an effort in the studies on a triazinethiol-containing anticorrosive coatings which is useful also to prevent the corrosion of a zinc-based plated steel, and previously disclosed a triazinethiol-containing anticorrosive coatings described in Japanese Patent Application No. 9-2557. Nevertheless, since triazinethiol is an expensive compound, an anticorrosive treatment agent available at a further low cost is desired.

Examples of the method for the surface treatment of zinc or a zinc alloy employing no chromium or triazinethiol are those described in Japanese Patent Application Laid-Open No. 54-71734 and No. 3-226584. Japanese Patent Application Laid-Open No. 54-71734 provides a method for the surface treatment of zinc or a zinc alloy wherein the surface of said zinc or zinc alloy is treated with an aqueous solution containing 0.5 g to 100 g/L of a 2 to 6 myoinositol-bound phosphate or a salt thereof, 0.5 to 30 g/L as a metal of one or more substances selected from the group consisting of titanium fluorides and zirconium fluorides and 1 to 50 g/L of thiourea or its derivative. Since this method involves the formation of a passive coating as a protective layer on the zinc surface, it requires a titanium fluoride or a zirconium fluoride. Japanese Patent Application Laid-Open No. 3-226584 discloses a surface treatment agent which is an aqueous solution at pH 5 to 10 comprising 0.02 g/L or more of one or more of $Ni^{2+}$ and $Co^{2+}$, ammonia and one or more primary amine group-containing compounds. Since this agent achieves the paint adhesiveness and the post-painting corrosion resistance as a result of the precipitation of cobalt or nickel, it requires $Ni^{2+}$ and/or $Co^{2+}$. As described above, a treatment agent containing a metal ion involves problematic characteristics such as an increased load upon waste water disposal.

In order to solve the problems mentioned above, we disclosed in Japanese Patent Application Laid-Open No. 9-123813 aqueous resin-based non-chromium-based anticorrosive coatings which contain a thiocarbonyl group-containing compound and a phosphate ion. This anticorrosive coatings provide a further increased corrosion resistance when incorporated with a water-dispersible silica. This procedure is a chromium-free process and exhibits an excellent anticorrosive effect, but was proven to undergo the reduction in the storage stability when an increased amount of the water-dispersible silica is added.

DISCLOSURE OF THE INVENTION

An objective of the present invention, in view of the problems described above, is to provide non-chromium anticorrosive coatings effective for a metal material and has a corrosion resistance higher than that of a chromium-containing anticorrosive agent and which is less expensive, and a method for the anticorrosive treatment. Further the present invention provides an anticorrosive-treated metal material treated with non-chromium anticorrosive coatings which have an excellent corrosion resistance. The anticorrosive coatings of the present invention contain a compound containing a thiocarbonyl group and a water dispersible silica in an aqueous solution of a water soluble resin but not containing substantial amount of a phosphate ion.

BEST MODE FOR CARRYING OUT THE INVENTION

The present invention relates to anticorrosive coatings comprising, in 1 liter of a composition containing at least one of aqueous resins and water as main ingredients, 0.2 to 50 g of at least one of thiocarbonyl group-containing compounds and 50 to 500 g of a water-dispersible silica, without a substantial amount of phosphate ion.

Furthermore, an anticorrosive treatment of the present invention is a method of coating anticorrosive coatings described above onto a metal material.

In the present specification the term "metal material" includes a steel, titanium, aluminum, copper plate or the like and a metal material plated by galvanizing, fused metal plating and the like. As the steel a cold-rolled steel, a hot-rolled steel, a stainless steel and the like are exemplified.

In the present specification the term "plated-steel" means a steel which is plated with a metal such as Zn, Al, Ni, Cr, Sn, Pb, Fe and the like, or an alloy of the above metal and at least one of any other metals. Examples of the other metals include Co, Ni, Fe, Cr, Al, Mg, Sn, Mn, Zn, Ti and the like. A metal which is alloyed by a heat treatment after the plating is also included. A small amount of another metal such as Co, Mo, WNi, Ti, Cr, Al, Mn, Fe, Mg, Pb, Sb, Sn, Cu, Cd, As and the like as a hetero-metal or an impurity, and/or a metal material in which at least one of inorganic compounds such as silica, alumina, titania and the like are dispersed, or a plating containing any ingredients other than Fe—P. The plating may contain plural layers.

The method of plating may include electro-galvanizing, fused metal plating, deposition, injection and the like.

Furthermore, an anticorrosive-treated metal material according to the present invention is a metal material which is coated with anticorrosive coatings described above.

For the purpose of achieving an effective anticorrosive coating performance, the following provisions: i.e., (1) the permeation of a corrosive fluid should be prevented, (2) an anticorrosive film should be in a close contact with a metal substrate, (3) a metal surface should be made passive using an anticorrosive ion or equivalent, and (4) an anticorrosive film should be water-resistant, acid-resistant and alkali-resistant, should be fulfilled. When even one of these provisions is not fulfilled, no anticorrosive effect is obtained. A chromium compound as a conventional anticorrosive agent is excellent especially in terms of provision (3), i.e., it has an excellent passiveness. The passiveness referred herein means to a state in which a metal or a metal alloy is kept inactive in spite of the environment thereof which activate it chemically or electrochemically.

Since a sulfide is readily adsorbed onto a metal surface similarly to a chromic acid, and has an excellent oxidizing ability, it can impart the metal surface with a passiveness. Accordingly, a thiocarbonyl group-containing compound which is one of the sulfides exhibits a rust inhibiting effect on the metal materials.

Thus, it is believed that (1) an ion of a thiol group in a thiocarbonyl group-containing compound is adsorbed onto an active site on the metal surface such as a zinc surface or an aluminum surface when anticorrosive coatings are applied, whereby exerting the anticorrosive effect. While a sulfur atom, in its nature, readily forms a coordinate bond with zinc or aluminum, a compound having a thiocarbonyl group (I):

(I)

is preferably one having a nitrogen or oxygen ion simultaneously such as in Formula (II).

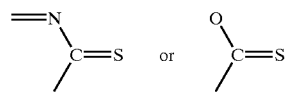
(II)

Since the nitrogen or oxygen atom in such compounds also forms a coordinate bond with a metal surface of zinc or aluminum, a thiocarbonyl compound, especially one having the both atoms simultaneously, readily undergoes the formation of a chelate bond on the zinc or aluminum, whereby achieving a more firm adsorption of the thiocarbonyl compound on the zinc surface. In addition, (2) a thiocarbonyl group-containing compound can serve also as a crosslinking promoting agent for a resin film. Such synergetic effect of the both mechanism may allow the number of micropores in the resin film to be reduced and serve as an efficient shield against water and undesirable ions such as chloride ion.

In a previous application, we ensured that the anticorrosive effect is improved markedly by combining a thiocarbonyl-group containing compound with a phosphate ion in anticorrosive coatings containing an aqueous resin whereby obtaining anticorrosive coatings which is more excellent than a conventional chromium-containing resin-based anticorrosive agent.

However, the system of a thiocarbonyl group/a phosphate ion/a water-dispersible silica described above was revealed to lack a satisfactory storage stability of the anticorrosive coatings while it did exhibit an excellent anticorrosive effect.

Unexpectedly, we discovered that a storage stability can be improved without affecting an anticorrosive effect adversely by means of removing a phosphate ion in the presence of a relatively large amount of a water-dispersible silica.

In the present specification the wording "removing or not-containing a substantial amount of phosphate ion" means that it is contained not more than about 100 ppm or more preferably not more than 50 ppm referring to the total amount of anticorrosive coatings.

The present invention is detailed below.

Thiocarbonyl group-containing compound-based anticorrosive coatings according to the present invention are detailed below.

A thiocarbonyl group-containing compound in the present invention means a compound having a thiocarbonyl group (I):

(I)

and also includes a compound capable of releasing a thiocarbonyl group-containing compound in an aqueous solution or in the presence of an acid or an alkali.

A representative example of such thiocarbonyl group-containing compound is a thiourea represented by Formula (III):

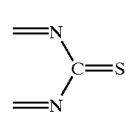
(III)

or its derivatives, such as methylthiourea, dimethylthiourea, ethylthiourea, diethylthiourea, diphenylthiourea, thiopental, thiocarbazide, thiocarbazones, thiocyanuric acids, thiohydantoin, 2-thiourasyl, 3-thiourazol and the like; a thioamide compound represented by Formula (IV):

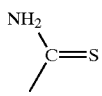

such as thioformamide, thioacetoamide, thiopropionamide, thiobenzamide, thiocarbostyryl, thiosaccharin and the like; a thioaldehyde compound represented by Formula (V):

such as thioformaldehyde, thioacetoaldehyde and the like; a carbothio acid represented by Formula (VI):

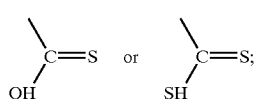

thiocarbonic acids having a thiocarboxyl group or a dithiocarboxyl group such as thioacetic acid, thiobenzoic acid, dithioacetic acid and the like, represented by Formula (VII):

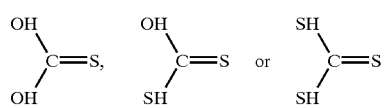

as well as a compound having a structure of Formula (I) such as thiocoumazone, thiocoumothiazone, Thionine blue-J, thiopyrone, thiopyrine, thiobenzophenone and the like.

Among these substances, those which can not directly be dissolved in water may be incorporated into anticorrosive coatings after dissolved in an alkaline solution. The pH value of the coatings is preferably within 3 to 12.

If the concentration of the thiocarbonyl-containing compounds is less than 0.2 g/l, the anticorrosive property becomes insufficient, and even if it exceeds 50 g/l, the anticorrosive property is not more improved, which is not preferable in the economical aspect and the resin will gelate depended on water soluble resins to be used so as not to be applied. Preferable concentration of the thiocarbonyl group containing compound is 0.5 g/l to 20 g/l.

By further combining anticorrosive coatings according to the present invention with 50 to 500 g of a water-dispersible silica in one liter of an entire composition containing an aqueous resin and water as main ingredients, the corrosion resistance can further be improved. In addition to the corrosion resistance, a drying ability, a wearing resistance and a film binding ability can also be improved.

A water-dispersible silica in the present invention means generally a silica characterized by an ability of keeping a stable dispersion in water without showing sedimentation semi-permanently due to its fine particle size. Such water-dispersible silica may not particularly be limited provided that it contains only small amounts of impurities such as sodium and that it is a weakly alkaline substance. For example, commercial silica gels such as "SNOWTEX N" (manufactured by NISSAN CHEMICAL INDUSTRIES, LTD.), "ADELITE AT-20N" (manufactured by ASAHI DENKA KOGYO K.K.), or commercial Aerosil powdered silica particles and the like may be employed.

The amount of the water-dispersible silica is preferably 50 g to 500 g in one liter of the aforementioned anticorrosive coatings. If the amount is less than 50 g, sufficient corrosion resistance cannot be achieved, whereas if the amount is more than 500 g, the corrosion resistance becomes maximum which is not preferable in the economic aspect. More preferably the amount is 100 g to 400 g per one litter.

Anticorrosive coatings according to the present invention comprise an aqueous resin. In the present invention, an aqueous resin includes a water-soluble resin as well as a resin which is naturally insoluble in water but is in the form of a microdispersion of such insoluble resin in water, such as an emulsion or a suspension. Such aqueous resin may for example be polyolefinic resins, polyurethane resins, acrylic resins, polycarbonate resins, epoxy resins, polyester resins, alkyd resins, phenol resins, other thermosetting resins, preferably those which can form crosslinkings. Particularly preferred resins are polyolefin resins, polyurethane resins and the mixtures of the both. A mixture of two or more of the aqueous resins listed above may also be employed.

The anticorrosive coatings of the present invention comprise an aqueous resin composition containing aqueous resins (water-soluble resins, water-dispersible resins etc.,) in an aqueous medium as film forming ingredients, and the aforementioned ingredients. The aqueous resin composition is a composition containing 1 to 80% by weight of the aqueous resin as a solid, which may contain organic solvents, viscosity controlling agents, pigments, dyes, surfactants and the like which are contained in usual aqueous anticorrosive coatings, and in general the aqueous resin composition means the ingredients other than thiocarbonyl group-containing compounds and water dispersible silicas in the anticorrosive coatings of the present invention.

Anticorrosive coatings according to the present invention may further contain other components. For example, pigments, surfactants and the like may be contained. For the purpose of improving the affinity of an aqueous resin with a silica particle and a pigment, and for the purpose of achieving an improved contact of the aqueous resin with the layer of the phosphate of zinc, aluminum or iron, a silane coupling agent may be incorporated.

Such pigment includes various colored pigments, for example, inorganic pigments such as titanium oxide ($TiO_2$), zinc oxide (ZnO), zirconium oxide (ZrO), calcium carbonate ($CaCO_3$), barium sulfate ($BaSO_4$), alumina ($Al_2O_3$), kaolin clay, carbon black, iron oxides ($Fe_2O_3$, $Fe_3O_4$) and the like, as well as organic pigments.

A silane coupling agent described above may for example be γ-aminopropyltrimethoxysilane, γ-aminopropyltriethoxysilane, γ-glycidoxypropyltrimethoxysilane, γ-methacryloxypropyltriethoxysilane, N-[2-(vinylbenzylamin)ethyl]-3-aminopropyltrimethoxysilane and the like.

An anticorrosive coatings according to the present invention may contain a solvent for the purpose of improving the film forming ability of an aqueous resin to forma further uniform and smooth film. Such solvent is not particularly limited and may be any of those used generally in a paint, such as alcohols, ketones, esters, ethers and the like.

In the present invention, anticorrosive coatings described above may be used as anticorrosive coatings for a zinc- or aluminum-coated steel or a non-coated steel to perform an anticorrosive treatment of the zinc-coated steel, the aluminum-coated steel or the non-coated steel. Such anticorrosive treatment can be accomplished by applying anticorrosive coatings according to the present invention to an article to be coated, followed by drying thus coated article by heating with a hot air, or, in an alternative process, by heating the article to be coated followed by applying the anticorrosive coatings according to the present invention to thus heated article, followed by drying with the heat still remaining in the article.

The above anticorrosive treatment is achieved by applying anticorrosive coatings of the present invention onto a material to be coated and drying and curing the coated material after the applying. As a method of drying and curing a hot air heating, an induction heating, an electro-heating, a near infrared ray heating, a far infrared heating and the like; as a method of drying the combination the above methods; as a method of curing the radiation of energy rays such ultra violet lights or electron rays or the combination of the heating methods and curing methods are exemplified, which may be selected according to the kinds of aqueous resins to be used. When the composition is dried and cured by the heat, the materials to be coated are previously heated, and then coated with the anticorrosive coatings at hot state as utilizing the afterheat or adding a required heat or energy.

When the composition is cured by heating the heating temperature is not always restrictive, but it is preferably 40° C. to 250° C. as a plate temperature. When the temperature is lower than 40° C., the drying speed of water is too slow to achieve a sufficient film formation in some cases, so that the anticorrosion ability is deficient. On the other hand, when the temperature is higher than 250° C. the corrosion resistance lowers and the appearance changes in some cases because of the decomposition of the aqueous resins. A preferable temperature is 60° C. to 200° C. After the application the coated materials are heated, and in case of drying the drying time is 1 sec. to 5 min., but it is not restrictive.

In an anticorrosive treatment described above, the thickness of the film of anticorrosive coatings according to the present invention is preferably 0.1 μm or more as a dried film. A thickness less than 0.1 μm causes an insufficient anticorrosive ability. On the other hand, a film, as an undercoat for painting, whose dry thickness is excessively greater, is economically disadvantageous, and may cause difficulty in the painting process, and, accordingly, a thickness of 0.1 to 20 μm is more preferred. A thickness of 0.1 to 10 μm is further preferred.

When using as an aqueous anticorrosive paint, a thickness of 0.1 μm or more may be acceptable.

In an anticorrosive treatment described above, a method for applying anticorrosive coatings according to the present invention is not particularly limited, and may employ a usual process, such as roll coating, air spraying, airless spraying, dipping and the like.

A material to be coated with anticorrosive coatings according to the present invention is a metal material as aforementioned.

Anticorrosive coatings according to the present invention may be used as an undercoat for painting and as an aqueous anticorrosive paint as described above and may also be utilized as an agent called "primary anticorrosive agent".

In addition, in the field of a coil coating, it may be utilized in the under coating process for a lubrication film of a metal material as well as in the under coating process for painting, and, when supplemented with a wax, it may also be utilized as a lubrication anticorrosive agent for a lubrication steel.

In the following examples, the corrosion resistance was evaluated by the method described below.

Method for Evaluation
(A) Anticorrosive Ability
a) Preparation of Test Article

An anticorrosive agent according to the present invention (solid content: 20% by weight) was applied to a commercially available electro-zinc-plated steel "EG-MO" and fused Al-10% Si-plated steel (plating amount: 30 g/m$^2$) using a bar coater #3 at the dry film thickness of 1 μm respectively, and then dried at PMT 150° C.

b) Salt Spray Test (SST Resistance)

A 5% aqueous solution of sodium chloride was sprayed onto the painting side of a coated article at 35° C. and the flat region and the Ericssen 7 mm-extruded region were evaluated for the degree of the white rust after 240 hours with the scale up to point 10 for the best. The evaluation criteria was as follows.

Point 10: No abnormality
Point 9: Between Point 10 and Point 8
Point 8: Slight formation of white rust
Point 7 to 6: Between Point 8 and Point 5
Point 5: Formation of white rust in half area
Point 4 to 2: Between Point 5 and Point 1
Point 1: Formation of white rust in entire area (B) Topcoat Adhesiveness
a) Preparation of Test Article An anticorrosive agent according to the present invention (solid content: 20% by weight) was applied to a commercially available electro-zinc-plated steel "EG-MO" and fused Al-10% Si-plated steel (plated amount: 30 g/m$^2$) using a bar coater No. 3 at the dry film thickness of 1 μm, and then dried at PMT 150° C. After drying, SUPERLAQ 100 (manufactured by NIPPON PAINT CO., LTD.; an acryl melamine paint) was coated using a bar coater at the dry thickness of 20 μm respectively, and then dried at 150° C. for 20 minutes to produce a topcoat adhesiveness test piece.

b) Primary Adhesiveness Test

An article obtained above was subjected directly to the three evaluations by the methods described below.

Lattice

An adhesive tape peeling behavior of a lattice of 1 mm interval cut was evaluated according to the criteria described below with the scale up to point 10 for the best.

Ericssen 7 mm

An adhesive tape was applied to a region extruded to Ericssen 7 mm, and the adhesive tape peeling behavior was evaluated similarly.

Lattice+Ericssen 7 mm

An adhesive tape was applied to a region obtained by extruding a lattice of 1 mm interval cut to Ericssen 7 mm, and the adhesive tape peeling behavior was evaluated similarly.

The evaluation was in accordance with the following criteria.

Point 10: No abnormality
Point 9: 10% or less of the determined lattice squares were peeled off.
Point 8: 20% or less of the determined lattice squares were peeled off.
Point 7: 30% or less of the determined lattice squares were peeled off.
Point 6: 40% or less of the determined lattice squares were peeled off.
Point 5: 50% or less of the determined lattice squares were peeled off.
Point 4: 60% or less of the determined lattice squares were peeled off.
Point 3: 70% or less of the determined lattice squares were peeled off.
Point 2: 80% or less of the determined lattice squares were peeled off.
Point 1: 90% or less of the determined lattice squares were peeled off.
Point 0: More than 90% of the determined lattice squares were peeled off.

c) Secondary Adhesiveness Test

A test piece was immersed in a boiling water for 30 minutes and then tested and evaluated similarly as in the primary test.

(C) Storage Stability

Anticorrosive coatings were stored in a thermostat chamber at 40° C. for 1 month, and the stability was evaluated based on the degree of the change in viscosity. The evaluation based on the viscosity was in accordance with the following criteria.

○: Change in viscosity within 5%
×: Change in viscosity exceeding 5%

EXAMPLE

According to the following Examples the present invention is illustrated in detail. In the Examples and Comparative Examples a concentration (g/liter) means the amount (g) of each component contained in one liter of the composition containing an aqueous resin and water as main ingredients.

Example 1

A pure water was admixed with a polyolefin resin ("HITECH S-7024", manufactured by TOHO CHEMICAL INDUSTRY CO., LTD.) and a polyurethane resin ("BONTIGHTER HUX-320" manufactured by ASAHI DENKA KOGYO K.K.) in the solid ratio of 1:1 (weight) to obtain the total concentration of the resin solid of 20% by weight, and then thiourea was dissolved at 5.0 g/L and finally 300 g/L of a water-dispersible silica ("SNOWTEX N" (manufactured by NISSAN CHEMICAL INDUSTRIES, LTD.) was added, and the mixture was dispersed by stirring for 30 minutes using DISPER and then adjusted at pH 8.0 to obtain anticorrosive coatings. For the purpose of evaluation for the primary anticorrosive ability and the topcoat adhesiveness, the anticorrosive coatings thus obtained was applied onto a commercial electrically zinc-plated steel (EP-MO, manufactured by NIPPON TEST PANEL, 70×150×0.8 mm) and dried as described above in the section of the evaluation. Prior to the evaluation, the electrically zinc-plated steel was degreased with an alkaline degreasing agent ("SURFCLEANER 53", manufactured by NIPPON PAINT CO., LTD.), washed with water, and then dried.

The results of the evaluation are shown in Table 1.

Example 2

Anticorrosive coatings were prepared similarly as in Example 1 except for using 1,3-diethyl-2-thiourea instead of thiourea as thiocarbonyl group-containing compound employed in Example 1, and then used for the anticorrosive treatment of an electrically zinc-plated steel, which was then evaluated for the anticorrosive ability and the topcoat adhesiveness similarly. The results of the evaluation are shown in Table 1.

Examples 3 and 4

Anticorrosive coatings were prepared similarly as in Example 1 except for using a different ratio of a polyolefin and a polyurethane used as the aqueous resins in Example 1 and a different amount of a water-dispersible silica "SNOWTEX" as indicated in Table 1, and then used for the anticorrosive treatment of an electrically zinc-plated steel, which was then evaluated for the anticorrosive ability and the topcoat adhesiveness similarly. The results of the evaluation are shown in Table 1.

Comparative Example 1

Anticorrosive coatings were prepared similarly as in Example 1 except for further adding ammonium phosphate at the concentration of 2.5 g/L as phosphate ion level, and then used for the anticorrosive treatment of an electrically zinc-plated steel, which was then evaluated for the anticorrosive ability and the topcoat adhesiveness similarly. The results of the evaluation are shown in Table 1.

Comparative Example 2

Anticorrosive coatings were prepared similarly as in Example 1 except for using 1,3-diphenyl-2-thiourea as a thiocabonyl group-containing compound, changing the amount of "SNOWTEX N" into 50 g/L and further adding ammonium phosphate at the concentration of 5.0 g/L as phosphate ion level, and then used for the anticorrosive treatment of an electrically zinc-plated steel, which was then evaluated for the anticorrosive ability and the topcoat adhesiveness similarly. The results of the evaluation are shown in Table 1.

TABLE 1

| | | anticorrosive coatings | | | | anticorrosive ability STT resistance | | Topcoat adhesiveness | | | | | | |
|---|---|---|---|---|---|---|---|---|---|---|---|---|---|---|
| | | Thiocarbonyl group-containing compound | | Phosphate ion | SNOW-TEX-N | | | Primary | | | Secondary | | | |
| | Aqueous resin type (mixture solid ratio) | Name of compound | (g/L) | (g/L) | (g/L) | Flat region | Er region | Lattice | Er | Lattice + Er | Lattice | Er | Lattice + Er | Storage stability |
| Example | | | | | | | | | | | | | | |
| 1 | Polyolefin resin/ polyurethane resin (1/1) | Thiourea | 5.0 | 0 | 300 | 10 | 10 | 10 | 10 | 10 | 10 | 10 | 10 | ◯ |
| 2 | Polyolefin resin/ polyurethane resin (1/1) | 1,3-diethyl-2-thiourea | 5.0 | 0 | 300 | 10 | 10 | 10 | 10 | 10 | 10 | 10 | 10 | ◯ |
| 3 | Polyolefin resin/ polyurethane resin (9/1) | Thiourea | 5.0 | 0 | 50 | 9 | 9 | 10 | 10 | 10 | 10 | 10 | 10 | ◯ |
| 4 | Polyolefin resin/ polyurethane resin (1/9) | Thiourea | 5.0 | 0 | 500 | 10 | 10 | 10 | 10 | 10 | 10 | 10 | 10 | ◯ |
| Comparative Example | | | | | | | | | | | | | | |
| 1 | Polyolefin resin/ polyurethane resin (1/1) | Thiourea | 5.0 | 2.5 | 300 | 10 | 10 | 10 | 10 | 10 | 10 | 10 | 10 | X |
| 2 | Polyolefin resin/ polyurethane resin (1/1) | 1,3-diphenyl-2-thiourea | 5.0 | 5.0 | 150 | 10 | 10 | 10 | 10 | 10 | 10 | 10 | 10 | X |

Note)
*"SNOWTEX N": Water-dispersible silica (manufactured by NISSAN CHEMICAL INDUSTRIES, LTD.)
*The unit of the amount added (g/L) represents the amount contained in 1 L of the mixture of an aqueous resin and water.

The aqueous resins indicated in Table 1 were the following commercial products:
Polyolefin resin: "HITECH S-7024" (manufactured by TOHO CHEMICAL INDUSTRY CO., LTD.)
Polyurethane resin: "BONTIGHTER HUX-320" (manufactured by ASAHI DENKA K.K.)

Example 5

A pure water was admixed with a polyolefin resin ("HITECH S-7024", manufactured by TOHO CHEMICAL INDUSTRY CO., LTD.) and a polyurethane resin ("BONTIGHTER HUX-320" manufactured by ASAHI DENKA KOGYO K.K.) in the solid ratio of 1:1 (weight) to obtain the total concentration of the resin solid of 20% by weight, and then thiourea was dissolved at 5.0 g/L and finally 300 g/L of a water-dispersible silica ("SNOWTEX N" (manufactured by NISSAN CHEMICAL INDUSTRIES, LTD.) was added, and the mixture was dispersed by stirring for 30 minutes using DISPER and then adjusted at pH 8.0 to obtain anticorrosive coatings. For the purpose of evaluation for the primary anticorrosive ability and the topcoat adhesiveness, the anticorrosive coatings thus obtained was applied onto a commercially available Al-10%-Si-plated steel and dried as described above in the section of the evaluation. Prior to the evaluation, the Al-10%-Si-plated steel was degreased with an alkaline degreasing agent ("SURFCLEANER 53", manufactured by NIPPON PAINT CO., LTD.), washed with water, and then dried.

The results of the evaluation are shown in Table 2.

Example 6

Anticorrosive coatings were prepared similarly as in Example 5 except for using 1,3-diethyl-2-thiourea instead of thiourea as thiocarbonyl group-containing compound employed in Example 5, and then used for the anticorrosive treatment of an Al-10%-Si-plated steel, which was then evaluated for the anticorrosive ability and the topcoat adhesiveness similarly. The results of the evaluation are shown in Table 1.

Examples 7 and 8

Anticorrosive coatings were prepared similarly as in Example 5 except for using a different ratio of a polyolefin and a polyurethane used as the aqueous resins in Example 5 and a different amount of a water-dispersible silica "SNOW-TEX" as indicated in Table 2, and then used for the anticorrosive treatment of an Al-10%-Si-plated steel, which was then evaluated for the anticorrosive ability and the topcoat adhesiveness similarly. The results of the evaluation are shown in Table 2.

Comparative Example 3

Anticorrosive coatings were prepared similarly as in Example 5 except for further adding ammonium phosphate at the concentration of 2.5 g/liter as phosphate ion level, and then used for the anticorrosive treatment of an Al-10%-Si-plated steel, which was then evaluated for the anticorrosive ability and the topcoat adhesiveness similarly. The results of the evaluation are shown in Table 2.

Comparative Example 4

Anticorrosive coatings were prepared similarly as in Example 5 except for using 1,3-diphenyl-2-thiourea as a thiocabonyl group-containing compound, changing the amount of "SNOWTEX N" into 50 g/liter and further adding ammonium phosphate at the concentration of 5.0 g/liter as phosphate ion level, and then used for the anticorrosive treatment of an Al-10%-Si-plated steel, which was then evaluated for the anticorrosive ability and the topcoat adhesiveness similarly. The results of the evaluation are shown in Table 2.

toxic thiocarbonyl group-containing compound and a water-dispersible silica, can be achieved. Therefore, non-chromium anticorrosive coatings which exhibit an excellent storage stability, are less environmentally toxic and have an excellent anticorrosive ability, can be provided.

In addition, an anticorrosive-treated metal material which is coated with a thiocarbonyl group-containing compound-based anticorrosive coatings according to the present inven-

TABLE 2

| | | anticorrosive coatings | | | | anticorrosive ability STT | | Topcoat adhesiveness | | | | | | |
|---|---|---|---|---|---|---|---|---|---|---|---|---|---|---|
| | | Thiocarbonyl group-containing compound | | Phos- phate ion (g/L) | SNOW- TEX-N (g/L) | | | Primary | | | Secondary | | | |
| | Aqueous resin type (mixture solid ratio) | Name of compound | (g/L) | | | resistance | | | | | | | | |
| | | | | | | Flat region | Er region | Lattice | Er | Lattice + Er | Lattice | Er | Lattice + Er | Storage stability |
| Example | | | | | | | | | | | | | | |
| 1 | Polyolefin resin/ polyurethane resin (1/1) | Thiourea | 5.0 | 0 | 300 | 10 | 10 | 10 | 10 | 10 | 10 | 10 | 10 | ○ |
| 2 | Polyolefin resin/ polyurethane resin (1/1) | 1,3- diethyl-2- thiourea | 5.0 | 0 | 300 | 10 | 10 | 10 | 10 | 10 | 10 | 10 | 10 | ○ |
| 3 | Polyolefin resin/ polyurethane resin (9/1) | Thiourea | 5.0 | 0 | 50 | 10 | 10 | 10 | 10 | 10 | 10 | 9 | 9 | ○ |
| 4 | Polyolefin resin/ polyurethane resin (1/9) | Thiourea | 5.0 | 0 | 500 | 10 | 10 | 10 | 10 | 10 | 10 | 10 | 10 | ○ |
| Comparative Example | | | | | | | | | | | | | | |
| 1 | Polyolefin resin/ polyurethane resin (1/1) | Thiourea | 5.0 | 2.5 | 300 | 10 | 10 | 10 | 10 | 10 | 10 | 10 | 10 | X |
| 2 | Polyolefin resin/ polyurethane resin (1/1) | 1,3- diphenyl- 2-thiourea | 5.0 | 5.0 | 150 | 10 | 10 | 10 | 10 | 10 | 10 | 10 | 10 | X |

Note)
*"SNOWTEX N": Water-dispersible silica (manufactured by NISSAN CHEMICAL INDUSTRIES, LTD.)
*The unit of the amount added (g/L) represents the amount contained in 1 L of the mixture of an aqueous resin and water.

The aqueous resins indicated in Table 1 were the following commercial products:
 Polyolefin resin: "HITECH S-7024" (manufactured by TOHO CHEMICAL INDUSTRY CO., LTD.)
 Polyurethane resin: "BONTIGHTER HUX-320" (manufactured by ASAHI DENKA K.K.)

As evident from the results described above, anticorrosive coatings supplemented with a thiocarbonyl group-containing compound and a water-dispersible silica according to the present invention exhibits markedly improved corrosion resistance and anticorrosive ability as well as an excellent storage stability, when compared with conventional chromate coatings.

Effects of the Invention

As described above, by using a thiocarbonyl group-containing compound-based anticorrosive coatings and an anticorrosive treatment according to the present invention, a higher anticorrosive ability and a higher storage stability than those of a conventional chromate-containing aqueous resin-based anticorrosive agent, as a result of the incorporation of the combination of an aqueous resin with a less tion and anticorrosive coatings supplemented further with a water-dispersible silica can inhibit the formation of rusts since a highly anticorrosive film is formed thereon because of the reason already mentioned above.

What is claimed is:

1. A composition which comprises at least one aqueous resin and water as main ingredients, and further comprises 0.2 to 50 g of at least one thiocarbonyl group-containing compound and 50 to 500 g of a water-dispersible silica per liter, with the proviso that the composition does not contain any phosphate ion.

2. The composition of claim 1, in which the amounts of the thiocarbonyl group-containing compound and the water-dispersible silica are 0.5 to 50 g and 100 to 400 g respectively in one liter of the composition.

3. A process for surface treatment of a metal material to impart corrosion resistance to the metal material, which comprises coating the composition of claim 1 onto the metal material.

4. Metal materials which are treated according to the process of claim 3.

5. A process for surface treatment of a metal material to impart corrosion resistance to the metal material, which comprises coating the composition of claim 2 onto the metal material.

6. Metal materials which are treated according to the process of claim 5.

* * * * *